United States Patent
Mäenpää et al.

(10) Patent No.: US 10,616,128 B2
(45) Date of Patent: Apr. 7, 2020

(54) METHOD AND SYSTEM FOR IDENTIFYING NETWORK RESOURCES

(71) Applicant: Telefonaktiebolaget LM Ericsson (publ), Stockholm (SE)

(72) Inventors: Jouni Mäenpää, Nummela (FI); Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/305,231

(22) PCT Filed: Apr. 23, 2014

(86) PCT No.: PCT/SE2014/050488
§ 371 (c)(1),
(2) Date: Oct. 19, 2016

(87) PCT Pub. No.: WO2015/163799
PCT Pub. Date: Oct. 29, 2015

(65) Prior Publication Data
US 2017/0048159 A1 Feb. 16, 2017

(51) Int. Cl.
*H04L 29/08* (2006.01)
*H04L 12/911* (2013.01)
(Continued)

(52) U.S. Cl.
CPC ............ *H04L 47/70* (2013.01); *G06F 9/5055* (2013.01); *H04L 61/1511* (2013.01);
(Continued)

(58) Field of Classification Search
CPC ................ G06F 9/46; H04L 61/1511
(Continued)

(56) References Cited

U.S. PATENT DOCUMENTS 8,145,762 B2 * 3/2012 Barber ................ G06Q 30/02
709/226
9,268,931 B2 * 2/2016 Subramaniam ..... H04L 63/0815
(Continued)

OTHER PUBLICATIONS

"Reexamining DNS From a Global Recursive Resolver Perspective"—Gao et al, Department of Computer Science, Northwestern University, Feb. 7, 2014 https://users.cs.northwestern.edu/~ychen/Papers/DNS_ToN15.pdf (Year: 2014).*
(Continued)

*Primary Examiner* — Randy A Scott
(74) *Attorney, Agent, or Firm* — Rothwell, Figg, Ernst & Manbeck, P.C.

(57) ABSTRACT

The disclosure relates to a method (50) performed in a distributed cloud network (1) for identifying a network resource of the distributed cloud network (1), wherein the distributed cloud network (1) is divided into a hierarchical distributed system comprising at least a first domain. The method (50) comprises receiving (51), in a first network node (11), a request from a client device (2) for a network resource to be used in providing a service, the request comprising at least one criterion relating to the network resource; resolving (52), in the first network node (11), a first part of the request, the first part corresponding to a first criterion relating to the network resource, thereby identifying one or more domains each comprising at least one network resource fulfilling the first criterion, and sending (53), from the first network node (11) to the client device (2), the one or more identifications corresponding to a respective one or more network resource fulfilling the at least one criterion. The disclosure also relates to method in network node, in client device, and to related nodes and devices.

28 Claims, 7 Drawing Sheets

(51) Int. Cl.
*H04L 29/12* (2006.01)
*G06F 9/50* (2006.01)

(52) U.S. Cl.
CPC .............. *H04L 67/02* (2013.01); *H04L 67/10* (2013.01); *H04L 67/1014* (2013.01); *H04L 67/20* (2013.01); *H04L 67/28* (2013.01)

(58) Field of Classification Search
USPC ........ 709/220, 225, 226, 229; 370/218, 229, 370/230
See application file for complete search history.

(56) References Cited

U.S. PATENT DOCUMENTS

| | | | | |
|---|---|---|---|---|
| 2001/0052016 | A1* | 12/2001 | Skene | G06F 9/505 709/226 |
| 2006/0129665 | A1* | 6/2006 | Toebes | H04L 29/12066 709/223 |
| 2008/0189290 | A1* | 8/2008 | Kim | G06F 16/248 |
| 2009/0031033 | A1* | 1/2009 | Deng | H04L 63/126 709/229 |
| 2011/0131335 | A1 | 6/2011 | Spaltro et al. | |

OTHER PUBLICATIONS

Fioreze, Tiago and Geert Heijenk, "Extending DNS to Support Geocasting Towards VANETs: A Proposal," 2010 IEEE Vehicular Networking Conference, XP031857815, ISBN: 978-1-4244-9526-9, Dec. 13, 2010, pp. 271-277.
International Search Report and Written Opinion issued in corresponding International Application No. PCT/SE2014/050488 dated Aug. 7, 2014, 9 pages.
Communication pursuant to Article 94(3) EPC for application serial No. EP 14 729 070.4 dated Aug. 2, 2019, 5 pages.

* cited by examiner

METHOD AND SYSTEM FOR IDENTIFYING NETWORK RESOURCES

CROSS REFERENCE TO RELATED APPLICATION(S)

This application is a 35 U.S.C. § 371 National Phase Entry Application from PCT/SE2014/050488, filed Apr. 23, 2014, designating the United States, the disclosure of which is incorporated by reference.

TECHNICAL FIELD

The technology disclosed herein relates generally to the field of cloud-based networks, and in particular to method for identifying network resources of a distributed cloud network.

BACKGROUND

There is a growing interest in providing and developing cloud environments, and many service providers offer cloud services to their customers. Such cloud services comprise for instance software as a service (SaaS) type of services such as e-mail, virtual desktops, gaming etc. The number of cloud service providers increases as do the sizes of their data centers, and also the number of servers in their respective systems.

Privacy breaches against users of the services provided within the cloud environments made by hackers or even by governmental intelligence agencies are occurring, comprising for instance retrieving private data from Internet services providers. International Internet organizations have started taking steps forward to avoid such occurrences in the future and to enforce user control is an important target of those organizations. Users of the various cloud services are thus becoming more and more aware of risks related to their use, such as for instance compromised privacy, integrity and security of their data. These concerns are met in various ways, e.g. by the service providers granting privacy and confidentiality by for instance providing encrypted connections.

It would be desirable to give users of cloud environments an increased control of resource usage within the cloud environment, whereby e.g. their privacy, integrity and security could be increased. This is however a delicate task, particularly in case of global cloud networks involving resources of several different operators. The sheer size alone of such system, comprising hundreds or thousands of servers, renders the provision of user control a difficult task.

SUMMARY

An object of the present teachings is to solve or at least alleviate at least one of the above mentioned problems.

The object is according to a first aspect achieved by a method performed in a distributed cloud network for identifying a network resource of the distributed cloud network. The distributed cloud network is divided into a hierarchical distributed system comprising at least a first domain. The method comprises receiving, in a first network node, a request from a client device for a network resource to be used in providing a service, the request comprising at least one criterion relating to the network resource; resolving, in the first network node, a first part of the request, the first part corresponding to a first criterion relating to the network resource, thereby identifying one or more domains each comprising at least one network resource fulfilling the first criterion; and sending, from the first network node to the client device, the one or more identifications corresponding to a respective one or more network resource fulfilling the at least one criterion.

The method enables the user to identify, and subsequently select, a particular network resource, which is to provide a service to the user. An advantage provided by the method is that a user can choose, in an understandable manner, which physical resource (e.g. which server) they should use for their service. Thereby the user is in control of his or her resource usage, and may select a particular network resource fulfilling e.g. security requirements set by the user.

The object is according to a second aspect achieved by a distributed cloud network for identifying a network resource of the distributed cloud network, wherein the distributed cloud network is divided into a hierarchical distributed system comprising at least a first domain. The distributed cloud network comprises:

at least one processor; and at least one memory storing instructions that, when executed by the at least one processor, causes the distributed cloud network to:

receive, in a first network node, a request from a client device for a network resource to be used in providing a service, the request comprising at least one criterion relating to the network resource, resolve, in the first network node, a first part of the request, the first part corresponding to a first criterion relating to the network resource, thereby identifying one or more domains each comprising at least one network resource fulfilling the first criterion, and send, from the first network node to the client device, the one or more identifications corresponding to a respective one or more network resource fulfilling the at least one criterion.

The object is according to a third aspect achieved by a network node of a distributed cloud network for identifying a network resource of the distributed cloud network, wherein the distributed cloud network is divided into a hierarchical distributed system comprising at least a first domain. The network node comprises:

a processor; and a memory storing instructions that, when executed by the processor, causes the network node to:

receive a request from a client device for a network resource to be used in providing a service, the request comprising at least one criterion relating to the network resource, resolve a first part of the request, the first part corresponding to a first criterion relating to the network resource, thereby identifying one or more domains each comprising at least one network resource fulfilling the first criterion, and send to the client device, the one or more identifications corresponding to a respective one or more network resource fulfilling the at least one criterion.

The object is according to a fourth aspect achieved by a computer program for a network node of a distributed cloud network for identifying a network resource of the distributed cloud network, wherein the distributed cloud network is divided into a hierarchical distributed system comprising at least a first domain. The computer program comprises computer program code, which, when run on the network node causes the network node to:

receive a request from a client device for a network resource to be used in providing a service, the request comprising at least one criterion relating to the network resource, resolve a first part of the request, the first part corresponding to a first criterion relating to the network resource, thereby identifying one or more domains each comprising at least one network resource fulfilling the first criterion, and send to the client device, the one or more identifications corresponding to a respective one or more network resource fulfilling the at least one criterion.

The object is according to a fifth aspect achieved by a computer program product comprising a computer program as above, and a computer readable means on which the computer program is stored.

The object is according to a sixth aspect achieved by a method in a client device for enabling a user to select a network resource of a distributed cloud network providing services to users. The method comprises:

sending, to a first network node, a request for a network resource to be used in a service, the request comprising at least one criterion relating to the network resource, receiving, from the first network node, one or more identifications corresponding to a respective one or more network resource fulfilling the at least one criterion, and displaying the one or more identifications on a display device, enabling a user to select one of the identified network resources to be used for the service.

The object is according to a seventh aspect achieved by a client device for enabling a user to select a network resource of a distributed cloud network providing services to users. The client device comprises:

a processor; and
a memory storing instructions that, when executed by the processor, causes the client device to:

send, to a first network node, a request for a network resource to be used in a service, the request comprising at least one criterion relating to the network resource, receive, from the first network node, one or more identifications corresponding to a respective one or more network resource fulfilling the at least one criterion, and display the one or more identifications on a display device, enabling a user to select one of the identified network resources to be used for the service.

The object is according to an eight aspect achieved by a computer program for a client device for selecting a network resource of a distributed cloud network providing services to users, the computer program comprising computer program code, which, when run on the client device causes the client device to:

send, to a first network node, a request for a network resource to be used in a service, the request comprising at least one criterion relating to the network resource, receive, from the first network node, one or more identifications corresponding to a respective one or more network resource fulfilling the at least one criterion, and display the one or more identifications on a display device, enabling a user to select one of the identified network resources to be used for the service.

The object is according to a ninth aspect achieved by a computer program product comprising a computer program as above, and a computer readable means on which the computer program is stored.

Further features and advantages of the present teachings will become clear upon reading the following description and the accompanying drawings.

DETAILED DESCRIPTION

Figure 1:
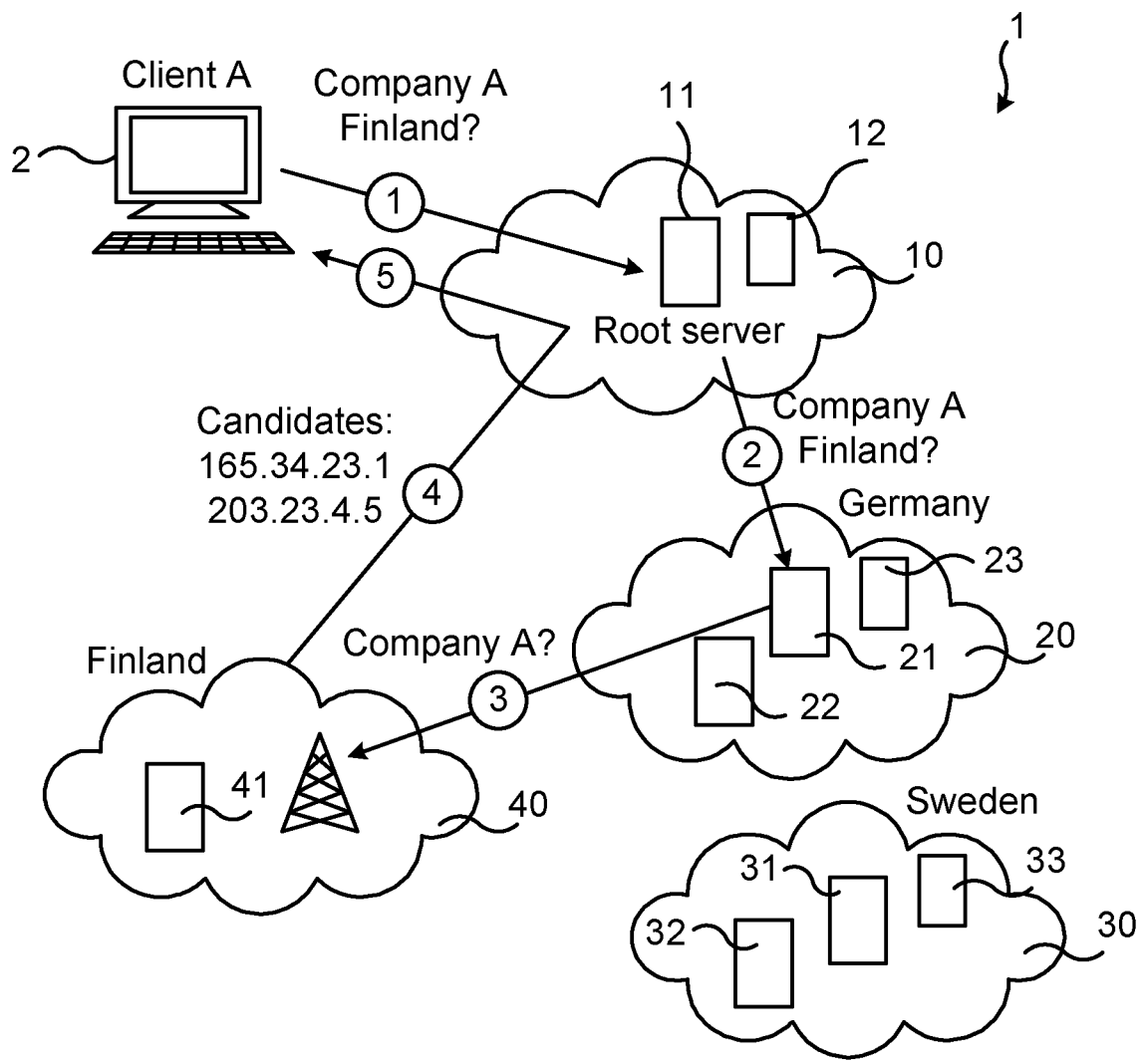
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In various aspects, the disclosure addresses technical challenges associated with letting users of a large-scale global cloud computing platform consisting of multiple geographically distributed data centers to control in a very detailed manner where in the cloud their services are being executed. As mentioned in the background section, this is a difficult problem to address for cloud service providers e.g. due to the massive size of their systems. Even though the privacy and confidentiality is granted in many public cloud computing platforms, enterprises and users want to have more control over the physical servers that are running the virtual machines handling their data and media. Therefore, as has been recognized by the inventors of the present disclosure, it is believed that the cloud service providers will have to offer some options to their customers enabling them to choose specific physical servers which specific capabilities and characteristics in their cloud networks.

In a centralized network, controlled entirely by a single operator, it may be possible to gather information of the physical servers of a cloud network. The cloud network could e.g. provide a directory service where a user could access the information through an application protocol.

The directory service dates back to the 1980's. The X.500 computer standards were developed by the International Telecommunication Union (ITU) in order to support requirements of electronic mail exchange and name lookup. The X.500 directory service was originally accessed via the Directory Access Protocol (DAP). Later on, the Lightweight Directory Access Protocol (LDAP) was developed. LDAP, as opposed to DAP, could be used directly over Transmission Control Protocol/Internet Protocol (TCP/IP). Over the years, LDAP has been developing further and LDAPv3 is the most recent LDAP version.

However, LDAP is a generic protocol which has not been tested in large cloud networks with up to thousand or millions of servers. In an aspect of the present disclosure, a new protocol is provided based on Domain Name System (DNS) to access the Directory services in the cloud.

DNS is already an integral part of practically all the computers on the Internet, which makes it easy to integrate aspects of the present disclosure in a cloud network. In addition, DNS is more lightweight than LDAP or DAP, and DNS works on top of TCP and User Datagram Protocol (UDP) as opposed to LDAP that works only on top of TCP. As is commonly known, UDP packet size is smaller than TCP packet sizes benefiting DNS over LDAP. Further, DNS uses a smaller number of packets per query and fewer round trips than LDAP. Round trips require servers to remember states in the protocol, which results in more complex software and consumption of memory resources.

While some existing solutions for directory services have limitations in hybrid cloud approaches, aspects of the present disclosure is well-functioning also in such hybrid cloud environments since DNS is already implemented in practically all type of networks independently of the network domain. Aspects of the disclosure may be implemented in an application layer, providing an extension of DNS mechanisms for querying and discovering resources.

Figure 2:
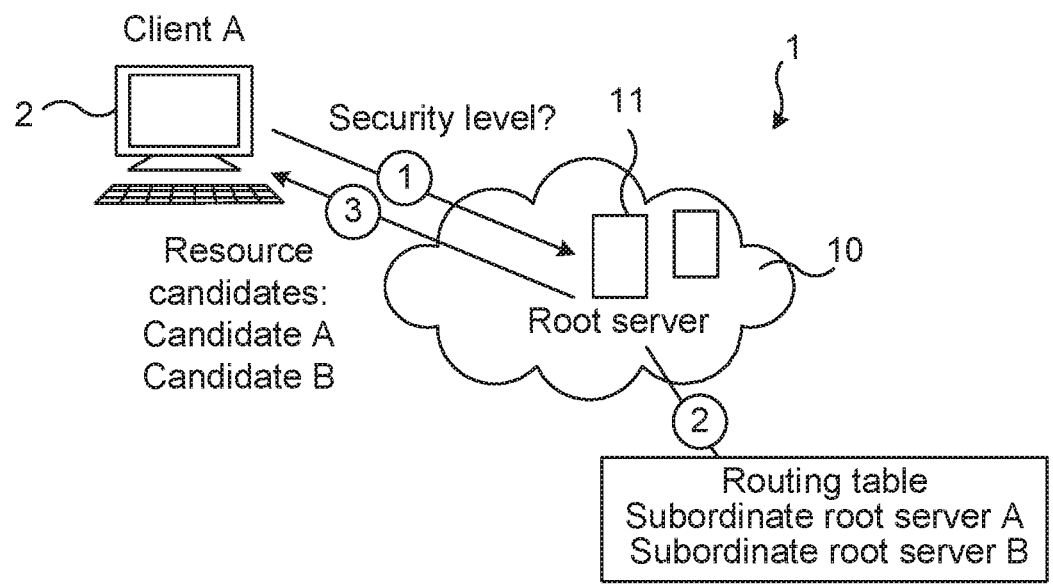
FIG. 2 illustrates schematically an environment in which embodiments of the present disclosure may be implemented.

In an aspect of the present disclosure discovery of resources (e.g., servers and virtual machines) is enabled in a large-scale distributed data center environment, also denoted distributed cloud network. Such an environment is illustrated in FIG. 1. However, aspects of the present disclosure may be implemented also in a centralized cloud network, an example of which is illustrated in FIG. 2. As an initial note on terminology, a distributed cloud network is a composition of network resources that are running at different locations, while still connected to a single network or hub service. A centralized cloud network is a composition of network resources gathered at a single location, e.g. machines that are running at the same location. The cloud network, distributed or centralized, can be operated by a single operator (normally they are private clouds) or by multiple operators.

FIG. 1 illustrates schematically an environment in which embodiments of the present disclosure may be implemented, and in particular a distributed cloud network. The cloud network 1 of FIG. 1 is thus distributed and comprises a number of sub-clouds 10, 20, 30, 40. Each sub-cloud 10, 20, 30, 40 in turn comprises a number of network resources, e.g. servers, databases, media servers running on virtual machines etc. Each such server may run virtual machines, which virtual machines may also be considered as separate network resources.

The network resources located at a particular location thus make up a sub-cloud. The sub-clouds 10, 20, 30, 40 are located at a respective location, for instance in different countries or different cities within a country etc. In the illustrated case, the cloud network 1 comprises four sub-clouds 10, 20, 30, 40, each sub-cloud located in a respective country. Each sub-cloud 10, 20, 30, 40 comprises at least one root server 11, 21, 31, 41. Each root server 11, 21, 31, 41 is configured with an initial cache of addresses of all root servers in the cloud network 10. Such a cache may be updated periodically, on request or upon need by an administrator using a reliable source. In the case illustrated in FIG. 1, a first sub-cloud 10 comprises a first root server 11 and another server 12, a second sub-cloud 20 comprises a second root server and two additional servers 22, 23, a third sub-cloud 30 comprises a third root server and two additional servers 32, 33, and a fourth sub-cloud 40 comprises only a root server 41.

A hierarchical distributed naming system is introduced in an aspect of the disclosure, providing a user-friendly mechanism that a user of a service can use to specify one or more physical nodes she wants to use for a particular service. A particular example of using this hierarchical distributed naming system is given in the following with reference to FIG. 1 for describing this aspect.

The hierarchical distributed naming system may use text-based queries, input by a user, that comprise one or more parts (strings) concatenated and delimited by dots. Each such part is in the following denoted label. An example of such string comprising three labels is: Company X.Country Y.Continent Z. The right-most label conveys the top-level rule. The hierarchy of rules descends from right to left; each label to the left specifies a subdivision, or sub-rule of the rule to the right.

As an example, a user (Client A in FIG. 1) in Europe wants to create a telephone conference in order to talk with her colleagues in Asia. Since the topic she wants to discuss is confidential and since she does not trust some cloud service providers, she wants to make sure to choose network resources (e.g. media servers for handling the conference call) that are located physically in Europe, and more particularly in Finland, and that are maintained by certain non-governmental institutions. In addition, she is looking for some media servers that have particular media capabilities and that can provide some security. One possibility to define such rule would be by the following string:

Company A.Finland.Europe

This rule may be sent in a DNS query to the first root server 11 of the first sub-cloud 10, which e.g. is closest to the client A (indicated at reference numeral 2). Using DNS queries is a preferred way of sending the request to the root server 11. However, if the cloud network 10 does not support DNS queries, the rule could be sent in different formats such as HyperText Transfer Protocol (HTTP) POST request or within a Session Description Protocol (SDP) payload of a signaling protocol message.

In the distributed cloud network 1, this rule is resolved as follows:

1. The user, i.e. Client A, will send (arrow denoted by 1 encircled) the request to the first root server 11 of the first sub-cloud 10 in the cloud network 1. This first root server 11 is, as mentioned, configured with an initial cache of the known addresses of the other root servers of the cloud network 1.

2. The first root server 11 will check the right-most label (i.e. label "Europe") and will try to resolve that rule. In this case, the first root server 11 will try to find a root server in Europe. Once the first root server 11 finds a root server in Europe, it will send (arrow indicated by 2 encircled) the rest of the request, i.e. "Company A.Finland" to that root server.

In the illustrated case the found root server is the second root server 21 of the second sub-cloud 20, located in Germany.

3. The second root server 21 (in Europe and in particular in Germany), receiving the request "Company A.Finland", will try to resolve the request of finding a root server in Finland (now the rightmost label) and will send (arrow indicated by 3 encircled) the remaining part of the request ("Company A") to the found Finnish root server, namely the fourth root server 41 in the fourth sub-cloud 40.

4. The fourth root server 41 will try to find media servers in Finland that belong to (or are handled by) Company A. Once found, it will send (arrow indicated by 4 encircled) the candidates back to the first root server 11 of the user (i.e. of Client A). In the illustrated case, the candidates are identified by Internet Protocol (IP) addresses: 165.34.23.1 and 203.23.4.5.

5. The first root server 11 then returns (arrow indicated by 5 encircled) this result to the user (Client A), whereby she is enabled to easily select a resource of her approval.

FIG. 2 illustrates schematically an environment in which embodiments of the present disclosure may be implemented, and in particular wherein the cloud network 1 comprises a centralized cloud network. As mentioned earlier, aspects of the present disclosure may be implemented also in such a centralized cloud network, and the hierarchical distributed naming system may be applied in this environment as well. The user 2 inputs a single rule, i.e. a string comprising a single label: "Security level", which is sent (arrow indicated by 1 encircled) to the first root server 11 of the cloud network 1 (which in this embodiment comprises a single sub-cloud, the cloud network thus being equal to the sub-cloud). The first root server 11 refers to a routing table comprising sub-ordinate root-servers in order to find resources fulfilling the rule, i.e. having the required security level. In the illustrated case the first root server 11 returns two resource candidates: Candidate A and Candidate B to the user 2. The user 2 may now easily select one of them (both fulfilling the rule input by the user).

In an aspect, the hierarchical distributed naming system provides a wildcard feature. Wildcard labels specify rules by substituting the whole records with matching components of the query.

In the following some interpretations of a few exemplary wildcard labels are described:

? A question mark may be used for indicating that there is zero or one instances of the preceding element of a label. For example, using three question marks, in label "???land" would match both "Finland" and "Iceland".

* An asterisk may be used for indicating that there is zero or more instances of the preceding element. If a label consists only of the asterisk, everything is accepted in place of that label.

Reverting to the described example (FIG. 1), if the user (client A) would like to use a media server located in Iceland or Finland, she could define a rule like that:

Company A.???land.Europe

In this case, the root server in Europe (second root server 21) would substitute the "???label" with some countries which match the request and it will send the request to the Finnish root server (fourth root server 41) and the Icelandic root server (not illustrated). Those root servers will try to find some servers handled by Company A and, if they do find such servers, they both will send the candidates to the first root server 11, which forwards all or some of the candidates to the user.

Following the same syntax, the user could not only query for servers in a certain location (countries, continents, areas) or server that belongs to certain institutions or corporations but, as well, the users could query for servers that have not been compromised in the past, or for recently added servers in the cloud network 1. Below are thus further examples given of queries that could be entered by the user:

age<5.*.Florida.UnitedStates.America—this query is looking for servers in Florida that are newer than 5 years old.

goverment.LevelOfSecurity3.China.Asia—this query is looking for servers physically located in China, which belong to the government and has a degree of security of 3. For instance, a security degree of 3 could indicate that the server supports Transport Layer Security (TLS) connections, implements access control, and monitors and audits its logs. The degree of security could be defined by the cloud provider or by the protocol. The degree of security of a server may be provided by protocol security and/or by cloud security, wherein protocol security comprises the secure protocols used by that server (the server could e.g. use protocols which are encrypted, such as TLS) and wherein cloud security involves a set of tools used by the cloud in order to protect the server, e.g. firewalls and Network Address Translations (NATs).

The level of security of a server can be defined by the number of times that information in the server has been compromised by hackers or spies. That information can be stored within the cloud network 1. The server may be given a security level defined e.g. by a number, wherein the higher the number, the more secure is the server (or vice versa).

It is noted that the location and the security are not the only possible queries. A user could try to gather information about the capacity of the server, the services provided by a server or free resources of a certain service in a server, among others things.

As mentioned earlier, a query is generated when a user 2 wants to discover specific physical nodes in the cloud network 1. The queries may be seen as extending DNS queries. An example of a query would be as following:

QName: Company A.???land.Europe

QType: Host Name

QClass: INET

In this case, the query of the user may be integrated in the DNS Query Section of the DNS packet. The query of the user may be integrated in the QName field name of the query. The QType and the QClass of the network resource being requested would be for the majority of the times host name and INET, respectively.

The QName can embed different queries separated by commas. So, a QName with various requests would look like the following:

QName: Company A.???land.Europe, age<5.*.Florida.UnitedStates.America

A response from the cloud network 1 would look similar to a DNS response. The response may be embedded in the Answer section of the DNS response packet. An example of a response packet from the previous request is as follows:

Company A.???land.Europe: type A, class INET, addr:192.35.40.2

Company A.???land.Europe: type A, class INET, addr:203.35.45.1

Company A.???land.Europe: type A, class INET,
    addr:393.35.44.1 age<5.*.Florida.UnitedStates.America: type A, class
    INET, addr: 3.4.5.2

In the previous example, the user gets four different IP addresses. The three first IP addresses are from the first query ("Company A.???land.Europe") and the last IP address is the result of the second query ("age<5.*.Florida.UnitedStates.America").

It is noted that both the query and the answer may be fully integrated with the existing DNS system. The modifications of the actual protocol are minimal, making it easy to integrate aspects of the present disclosure in existing distributed cloud networks 1.

DNS type of queries is, as mentioned, a preferred way of sending the request to the servers. However, if the cloud network 1 does not support DNS (which is expected to be relatively unlikely, since the majority of networks support DNS), the queries could be sent in different formats such as MIT POST request or within an SDP (Session Description Protocol) payload of a signaling protocol message.

Figure 3:
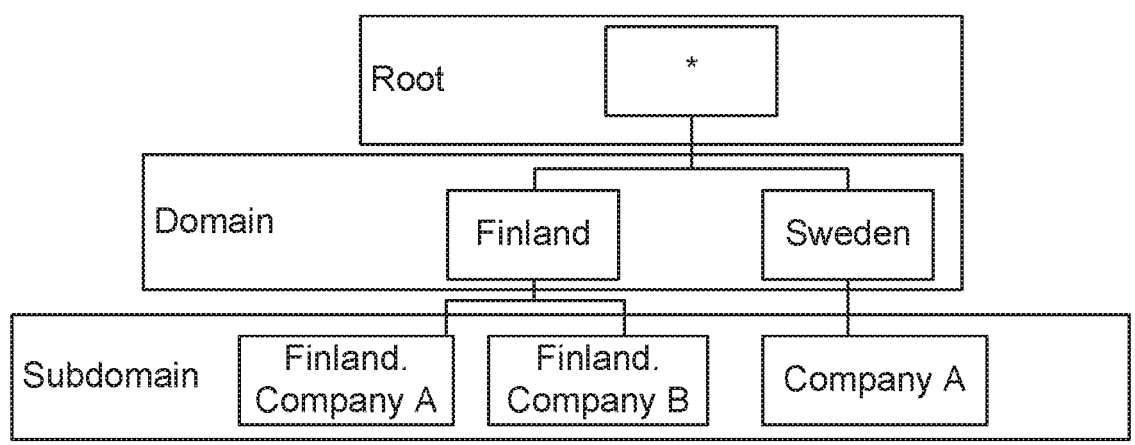
FIG. 3 illustrates a hierarchical division of a cloud-based network.

FIG. 3 illustrates a hierarchical division of a cloud-based network. The hierarchical distributed naming system is maintained by using a client-server model. In the system, a cloud-based network (e.g. cloud network 1) is divided into domains and each domain has at least one root server. In the example of FIG. 1, a sub-cloud 10, 20, 30, 40 corresponds to a domain. Each root server may store information about the servers below it in the hierarchy in a database.

It is noted that the country code Top Level Domains (ccTLDs) of DNS can be seen as an example of a root server mapping the geographical regions and the domain names. However, ccTLDs are only related to the top level domain of the DNS servers. The present disclosure extends the ccTLD to all the domains and subdomains of the DNS servers.

In addition, every root server may implement a routing table. In this routing table, the root server stores information about its subordinate root servers in other sub-clouds or other cloud networks. In addition, such routing table may comprise information about the parent of the root server.

Referring to FIG. 3, a root server maintains information about domains of the cloud network 1, in the illustrated case domains Finland (fourth sub-cloud 40) and Sweden (third sub-cloud 30). The domain Finland has two sub-domains: Company A and Company B, while domain Sweden has only one sub-domain: Company A.

Figure 4:
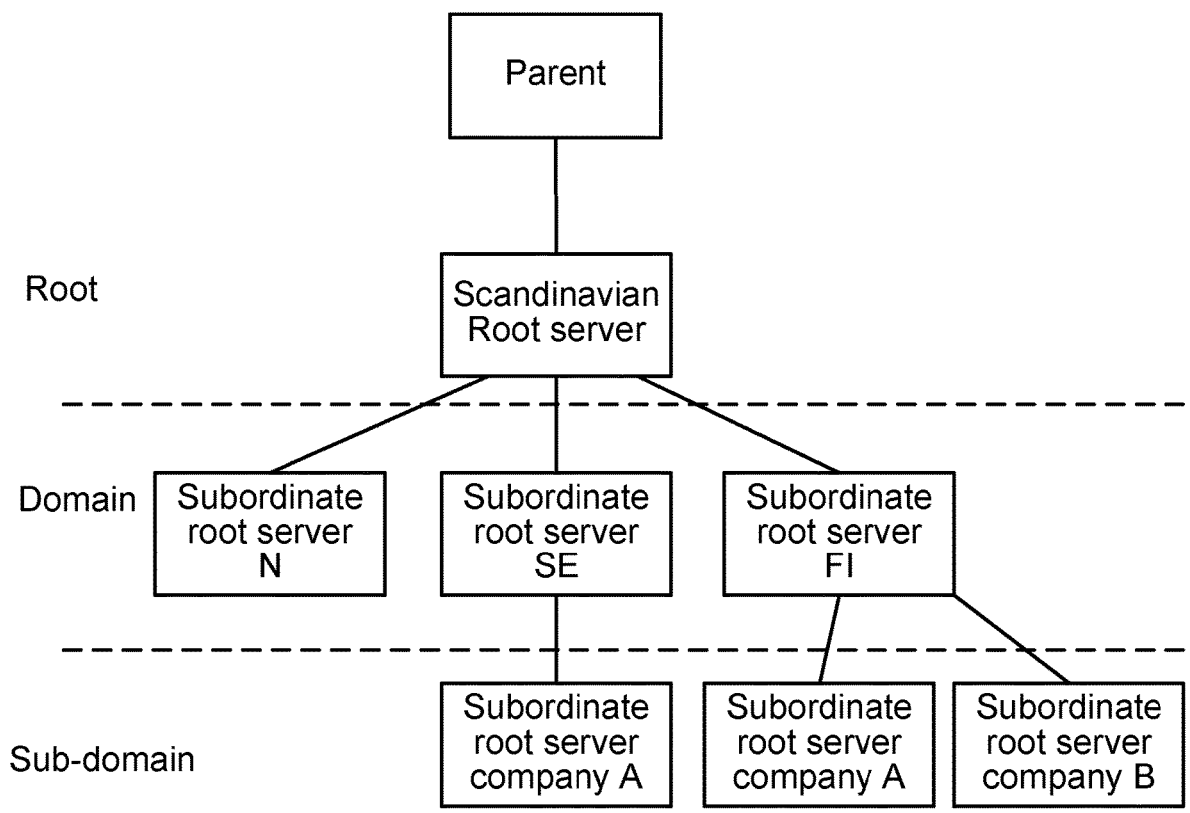
FIG. 4 illustrates a hierarchical division of a cloud-based network.

FIG. 4 illustrates another example of the hierarchical division of a cloud-based network. The root server here is a Scandinavian root server, having information about root servers of three domains: domain Norway (Subordinate root server N), domain Sweden (Subordinate root server SE) and domain Finland (Subordinate root server FI). The root server of domain Sweden has in turn information about a subordinate root server of a sub-domain Company A. The root server of domain Finland has in turn information about two subordinate root servers of two sub-domains: sub-domain Company A, and sub-domain Company B. The Scandinavian Root server may also have a parent.

Subordinate root servers are servers that represent a small subgroup of servers in the same cloud network 1. On the other hand, parent servers represent a larger group of servers. For instance, a subordinate root server may represent the servers that belong to Finland. A parent root server may represent a larger group of servers. For instance, a Scandinavian parent server may represent all servers belonging to Scandinavia, that parent server thus representing all servers in Finland too.

Below is an example of a routing table in a root server:

| | |
|---|---|
| Norway | 56.3.3.4 |
| Sweden | 67.3.4.9 |
| Finland | 180.3.2.1 |
| * | 123.23.4.6 |

In this routing table example, the root server represents the Scandinavian countries. In case the server can resolve the request, it can send the request to some of its subgroups (Norway, Sweden, or Finland) or to its parent (which is represented by an *).

So far, systems and methods to discover physical nodes in a large-scale distributed data center environment, i.e. cloud network 1, has been described. However, the utilization of such system for the end user can be cumbersome. In the following, different forms of using the hierarchical distributed naming system will therefore be described, making its use easier to the end user:

Third-party node: In this case, a user or a community of users can use a node maintained and operated by some third party (e.g., by a cloud network provider) to automate the discovery of physical nodes in the network. The users can define their preference and profile in that node and every time they have to start a new service in the cloud network 1, the Third-party node will discover the most appropriate physical nodes for the service. Thus, the Third-party node could send the information to the users or, instead, could even start the service on behalf of the users.

This solution could be used, for instance, in enterprises or in specific private networks as a third-party server. Another example of use would be use in the end user's system; in this case, the Third-party node could be an application running in their computers.

Robot generator: Many users might not have the ability or the knowledge to generate accurate queries in the system. A Robot Generator would instead generate the accurate query for the user. The robot, which can for instance be a webpage or a simple application installed in the computer of the user, could help the user to generate the correct query. The user would only need to introduce (or specify) some data in the system (e.g. location of server, level of security) and the Robot Generator would generate a well-formed query based on that input.

Test Applications: users with more expertise might want to create their own queries for some specific services. Those users, after creating a query, could use a test application instead to verify that their query is correct. A Test Application will not only verify that the query is well-formed but it will verify the correctness of such query. It will verify if the values of the query are valid for the specific cloud network where the user wants to create the service. Such Test Applications could be provided by the cloud network provider.

Once some physicals servers are chosen for a certain cloud service, the hierarchical distributed naming system should ensure that third party non-authorized servers are not able to read the information transferred between the clients. To achieve this, there are already well-established security methods to do that. The most common method is the creation of TLS (Transport Layer Security) channels between the physical servers. So, even though the information might go through some undesired servers, those servers would not be able to read the information since the TLS channel is encrypted.

Another method is the key distribution method. The chosen servers share the same cryptographic key. Users who want to send their data through those servers encrypt their data with the public key of the servers. In this case, the users should rely on the servers. So, the server will again encrypt the data of that client once it finishes manipulating her data.

The hierarchical distributed naming system defined in these methods relies on secure servers. The chosen servers should be secured against attacks and not be compromised with spyware or any type of malware. Nevertheless, using this solution, the users can choose the level of security of the server minimizing the risk of having compromised servers in the data communication path.

The various embodiments and features that have been described may be combined in different ways.

Figure 5:
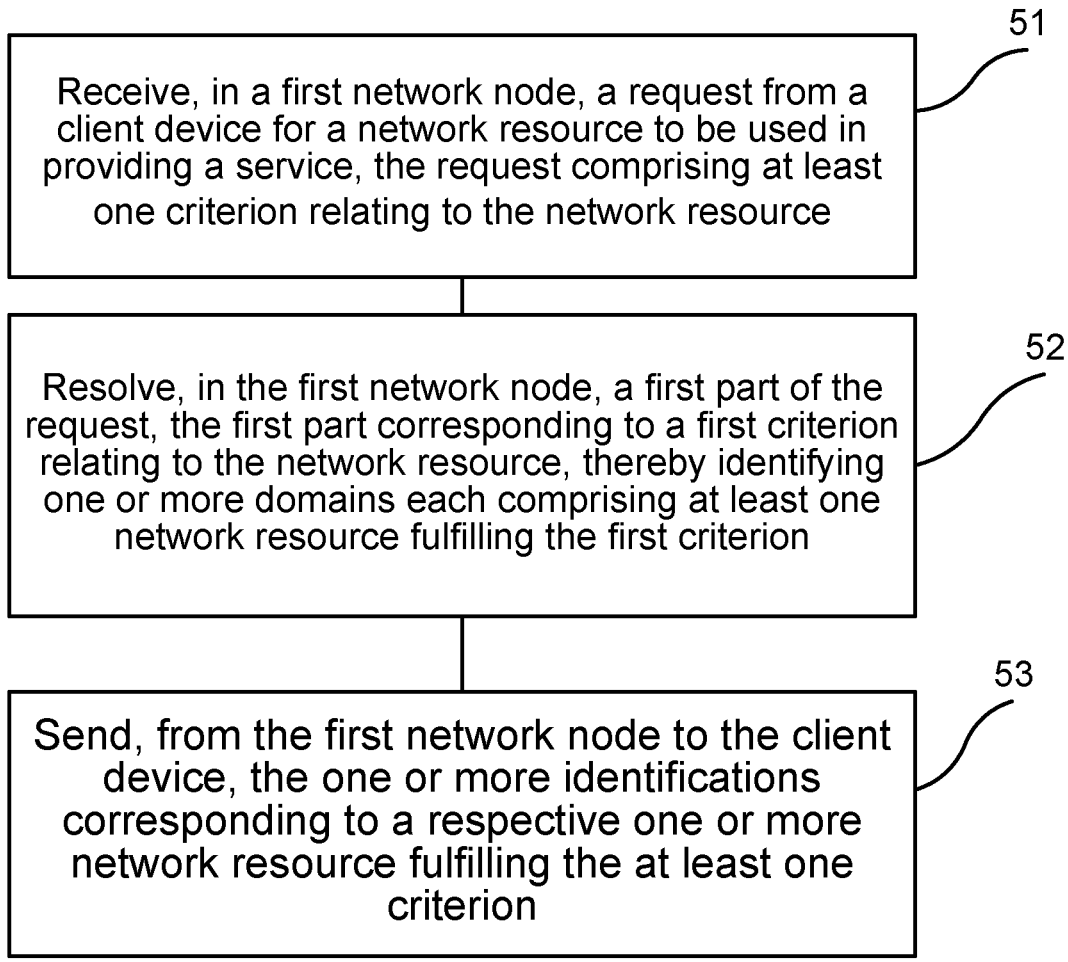
FIG. 5 illustrates a flow chart over steps of a method in a distributed cloud network or in a network node thereof in accordance with the present disclosure.

FIG. 5 illustrates a flow chart over steps of a method in a distributed cloud network 1, or in a network node thereof, in accordance with the present disclosure. The method 50 is performed in a distributed cloud network 1 for identifying a network resource of the distributed cloud network 1, wherein the distributed cloud network 1 is divided into a hierarchical distributed system comprising at least a first domain.

The method 50 comprises receiving 51, in a first network node 11, a request from a client device 2 for a network resource to be used in providing a service, the request comprising at least one criterion relating to the network resource. For example, a user of a client device 2 may want to select a particular network resource for a service that he wants, and inputs to his client device 2 (e.g. a computer) a criterion defining a characteristic of the desired network resource. The criterion may be a label of a string, as has been described earlier. The client device 2 sends this request to a network node, in particular a root server 11, of the cloud network 1.

The method 50 comprises resolving 52, in the first network node 11, a first part of the request, the first part corresponding to a first criterion relating to the network resource, thereby identifying one or more domains each comprising at least one network resource fulfilling the first criterion. Continuing the example, the root server 11 resolves the request as far as it is able to, e.g. establishing network resources fulfilling the first criterion, e.g. a first label (the rightmost one) of a received string.

The method 50 comprises sending 53, from the first network node 11 to the client device 2, the one or more identifications corresponding to a respective one or more network resource fulfilling the at least one criterion. Still continuing the example, the root server now sends the result to the client device 2, which may display the result for the user. The user may then easily select a desired network resource.

Figure 6:
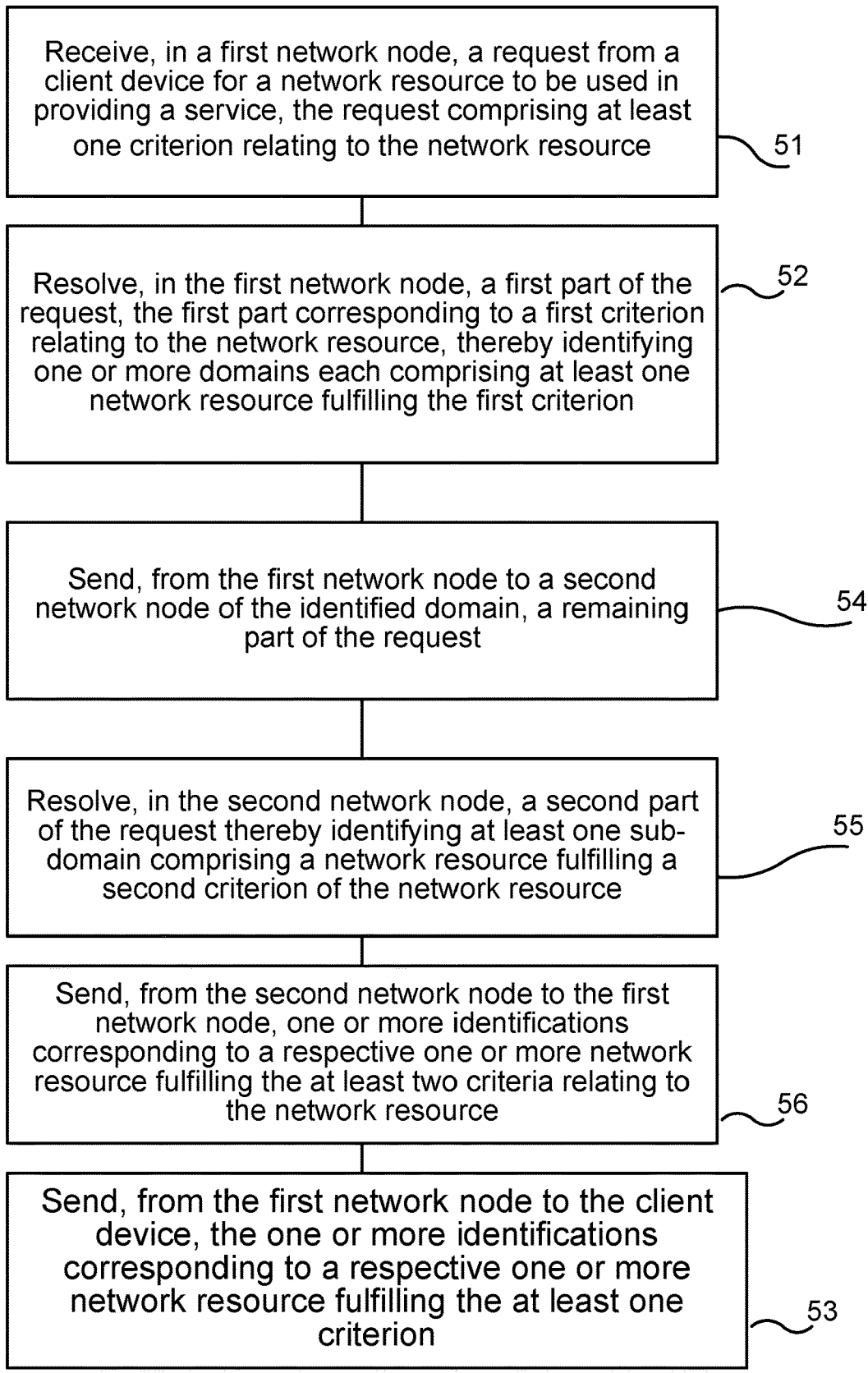
FIG. 6 illustrates a flow chart over steps of a method in a distributed cloud network or a network node thereof in accordance with the present disclosure.

In an embodiment of the method 50, illustrated in FIG. 6, the hierarchical distributed system comprises at least one sub-domain subordinate to the first domain. The method 50 comprises, for a request comprising at least two criteria, after the resolving 52 and prior to the sending 53:
  sending 54, from the first network node 11 to a second network node 21 of the identified domain, a remaining part of the request,
  resolving 55, in the second network node 21, a second part of the request thereby identifying at least one sub-domain comprising a network resource fulfilling a second criterion of the network resource, and
  sending 56 from the second network node 21 to the first network node 11, one or more identifications corresponding to a respective one or more network resource fulfilling the at least two criteria relating to the network resource.

Depending on how many criteria relating to the desired network resource that is received in the first network node 11, one, two or more hierarchically lower network nodes would be involved. Each network node would then resolve part of the initial request.

In a variation of the above embodiment, the sending 53, from the first network node 11 to the client device 2, comprises sending one or more identifications corresponding to a respective one or more network resource fulfilling the at least two criteria. Examples of such identifications comprise Internet Protocol, IP, addresses.

In an embodiment, the method 50 comprises, prior to receiving 51, in a first network node 11 a request from a client device 2, receiving in the client device 2 a user input comprising the at least one criterion.

In an embodiment, each domain comprises at least one root server 11, 21, 31, 41 and each root server 11, 21, 31, 41 is capable of obtaining information about root servers lower in the hierarchy of domains. That is, each domain may correspond to a sub-cloud of the cloud network 1, each sub-cloud in turn e.g. constituting a geographical area where the network resources of the sub-cloud are gathered.

In an embodiment, the request comprises one or more of: physical location of the network resource, ownership of the network resource, security level of the network resource, capacity of the network resource, services provided by the network resource, free resources of a particular service, hardware available or connected to the network resource, latency between the client device 2 and the network resource, bandwidth between the client device 2 and the network resource. It is noted that there are several other criteria that could be included in the request.

In an embodiment, the request is sent in an extended Domain Name System query message, a Hypertext Transfer Protocol POST request or in a Session Description Protocol payload of a signaling protocol message.

In an embodiment, the method 50 is performed in the first network node 11.

In a variation of the above embodiment, wherein the method is performed in the first network node 11, the hierarchical distributed system comprises at least one sub-domain subordinate to the first domain, the method 50 comprising, for a request comprising at least two criteria, after the resolving 52 and prior to the sending 53:
  sending 54, to a second network node 21 of the identified domain, a remaining part of the request,
  receiving, from the second network node 21, one or more identifications corresponding to a respective one or more network resource fulfilling the at least two criteria relating to the network resource.

The first network node 11 thus performs the steps of: receiving 51 a request from a client device 2 for a network resource, resolving 52, in the first network node 11, a first part of the request, sending 54, to a second network node 21 of the identified domain, a remaining part of the request, receiving, from the second network node 21, one or more identifications corresponding to a respective one or more network resource fulfilling the at least two criteria relating to the network resource, and sending 53 to the client device 2, the one or more identifications corresponding to a respective one or more network resource fulfilling the at least one criterion.

It is thus noted that the method 50 may be performed in a distributed manner within the cloud network 1, i.e. involving two or more network nodes. The disclosure encompasses a distributed cloud network in which the method as described may be implemented. The distributed cloud network 1 is configured for identifying a network resource of the distributed cloud network 1, wherein the distributed cloud network 1 is divided into a hierarchical distributed system comprising at least a first domain. The distributed cloud network 1 comprises:

at least one processor 60; and at least one memory 61 storing instructions 62 that, when executed by the at least one processor 60, causes the distributed cloud network 1 to:

receive, in a first network node 11, a request from a client device 2 for a network resource to be used in providing a service, the request comprising at least one criterion relating to the network resource, resolve, in the first network node 11, a first part of the request, the first part corresponding to a first criterion relating to the network resource, thereby identifying one or more domains each comprising at least one network resource fulfilling the first criterion, and send, from the first network node 11 to the client device 2, the one or more identifications corresponding to a respective one or more network resource fulfilling the at least one criterion.

In an embodiment, the hierarchical distributed system comprises at least one sub-domain subordinate to the first domain, the distributed cloud network 1 being operative to, for a request comprising at least two criteria, after the resolving and prior to the sending:

send, from the first network node 11 to a second network node 21 of the identified domain, a remaining part of the request, resolve, in the second network node 21, a second part of the request thereby identifying at least one sub-domain comprising a network resource fulfilling a second criterion of the network resource, and send from the second network node 21 to the first network node 11, one or more identifications corresponding to a respective one or more network resource fulfilling the at least two criteria relating to the network resource.

In a variation of the above embodiment, the distributed cloud network 1 is operative to send, from the first network node 11 to the client device 2, by sending one or more identifications corresponding to a respective one or more network resource fulfilling the at least two criteria.

In an embodiment, the distributed cloud network 1 is operative to, prior to receiving, in a first network node 11 a request from a client device 2, receive in the client device 2 a user input comprising the at least one criterion.

In an embodiment, each domain comprises at least one root server 11, 21, 31, 41 and each root server 11, 21, 31, 41 is capable of obtaining information about root servers lower in the hierarchy of domains.

In various embodiments, the request comprises one or more of: physical location of the network resource, ownership of the network resource, security level of the network resource, capacity of the network resource, services provided by the network resource, free resources of a particular service, hardware available or connected to the network resource, latency between the client device 2 and the network resource, bandwidth between the client device 2 and the network resource.

In different embodiments, the request is included in an extended Domain Name System query message, a Hypertext Transfer Protocol POST request or in a Session Description Protocol payload of a signaling protocol message.

Figure 7:
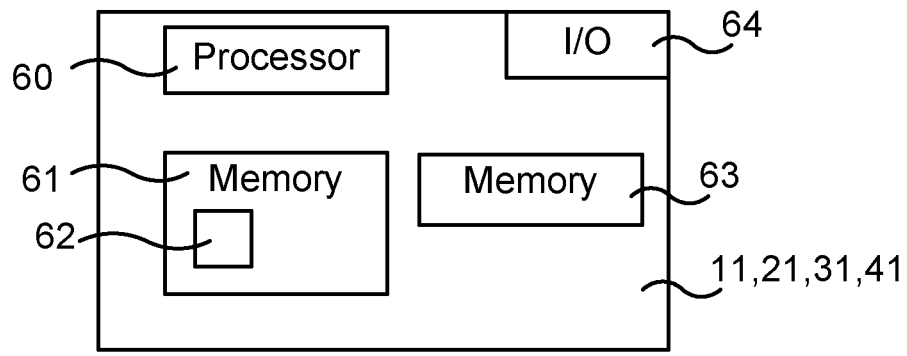
FIG. 7 illustrates schematically a network node and means for implementing embodiments of a method of the present disclosure.

FIG. 7 illustrates schematically a network node and means for implementing embodiments of a method of the present disclosure. The network node 11 comprises a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method as described in relation to FIGS. 5 and 6.

In particular, a network node 11 of a distributed cloud network 1 is provided configured for identifying a network resource of the distributed cloud network 1, wherein the distributed cloud network 1 is divided into a hierarchical distributed system comprising at least a first domain. The network node 11 comprises:

a processor 60; and a memory 61 storing instructions 62 that, when executed by the processor 60, causes the network node 11 to:

receive a request from a client device 2 for a network resource to be used in providing a service, the request comprising at least one criterion relating to the network resource, resolve a first part of the request, the first part corresponding to a first criterion relating to the network resource, thereby identifying one or more domains each comprising at least one network resource fulfilling the first criterion, and send to the client device 2, the one or more identifications corresponding to a respective one or more network resource fulfilling the at least one criterion.

In an embodiment, the hierarchical distributed system comprises at least one sub-domain subordinate to the first domain, the network node 11 being operative to, for a request comprising at least two criteria, after the resolving and prior to the sending:

send, to a second network node 21 of the identified domain, a remaining part of the request, receive, from the second network node 21, one or more identifications corresponding to a respective one or more network resource fulfilling the at least two criteria relating to the network resource.

Still with reference to FIG. 7, the memory 61 can be any combination of read and write memory (RAM) and read only memory (ROM). The memory 61 also comprises persistent storage, which, for example, can be any single one or combination of magnetic memory, optical memory, solid state memory or even remotely mounted memory.

A data memory 63 may also be provided for reading and/or storing data during execution of software instructions in the processor 60. The data memory 63 can be any combination of read and write memory (RAM) and read only memory (ROM).

The network node 11 comprises an input/output device 64 for communicating with other network nodes. Such input/output device may for example comprise an interface.

The present disclosure also encompasses a computer program product 61 comprising a computer program 62 for implementing the methods as described above, and a computer readable means on which the computer program 62 is stored. The computer program product 61 may be any combination of read and write memory (RAM) or read only memory (ROM). The computer program product 61 may also comprise persistent storage, which for example can be any single one or combination of magnetic memory, optical memory or solid state memory.

The present disclosure thus comprise a computer program 62 for a network node 11 of a distributed cloud network 1 for identifying a network resource of the distributed cloud network 1, wherein the distributed cloud network 1 is divided into a hierarchical distributed system comprising at least a first domain. The computer program 62 comprises computer program code, which, when run on the network node 11 causes the network node 11 to:

- receive a request from a client device 2 for a network resource to be used in providing a service, the request comprising at least one criterion relating to the network resource,
- resolve, a first part of the request, the first part corresponding to a first criterion relating to the network resource, thereby identifying one or more domains each comprising at least one network resource fulfilling the first criterion, and
- send to the client device 2, the one or more identifications corresponding to a respective one or more network resource fulfilling the at least one criterion.

The computer program product, or the memory, thus comprises instructions executable by the processor. Such instructions may be comprised in a computer program, or in one or more software modules or function modules.

Figure 8:
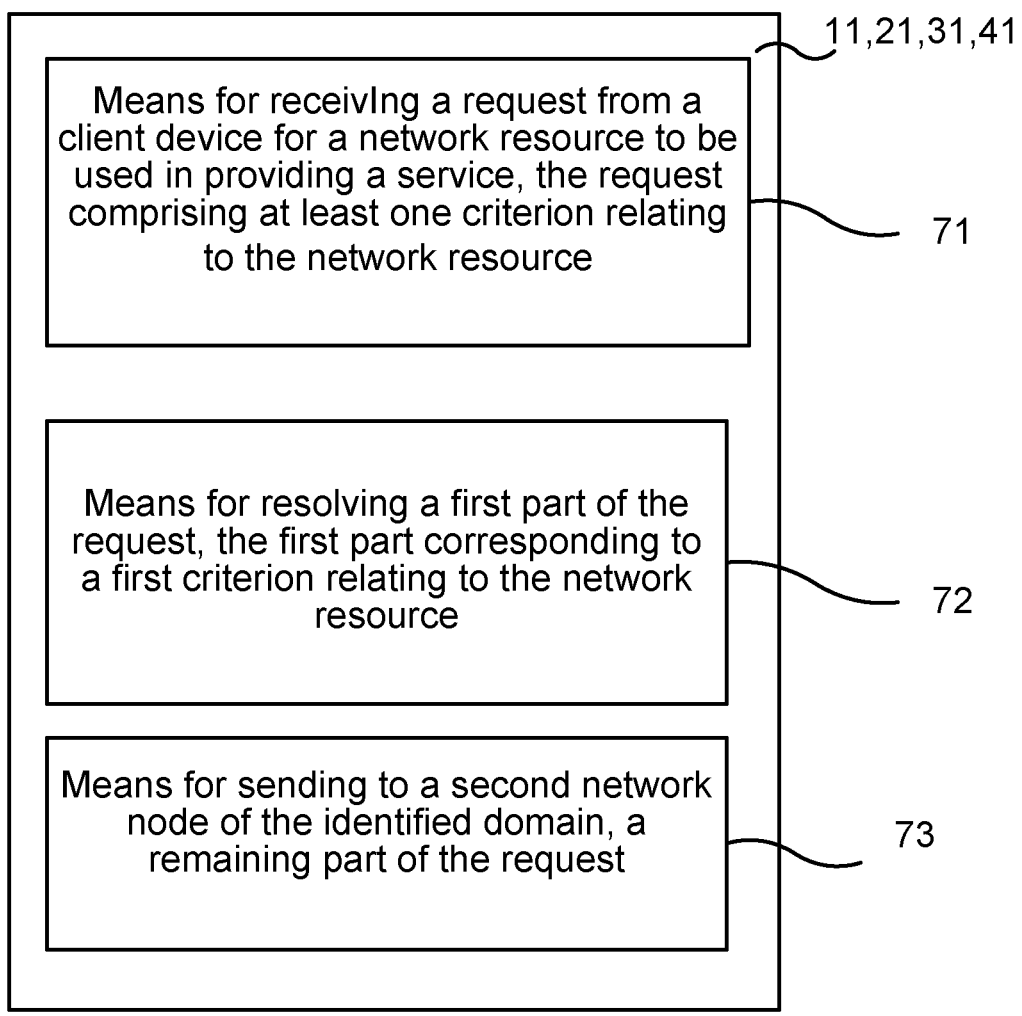
FIG. 8 illustrates a network node comprising function modules/software modules for implementing embodiments of methods of the present disclosure.

An example of an implementation using function modules/software modules is illustrated in FIG. 8, in particular illustrating a network node 11 comprising function modules for implementing methods of the present disclosure. The network node 11 comprises first means 71, for example a first function module, for receiving a request from a client device 2 for a network resource to be used in providing a service, the request comprising at least one criterion relating to the network resource. The network node 11 comprises second means 72, for example a second function module, for resolving, a first part of the request, the first part corresponding to a first criterion relating to the network resource, thereby identifying one or more domains each comprising at least one network resource fulfilling the first criterion. The network node 11 comprises third means 73, for example a third function module, for sending to the client device 2, the one or more identifications corresponding to a respective one or more network resource fulfilling the at least one criterion The functional modules 71, 72, 73 can be implemented using software instructions such as computer program executing in a processor and/or using hardware, such as application specific integrated circuits, field programmable gate arrays, discrete logical components etc.

Figure 9:
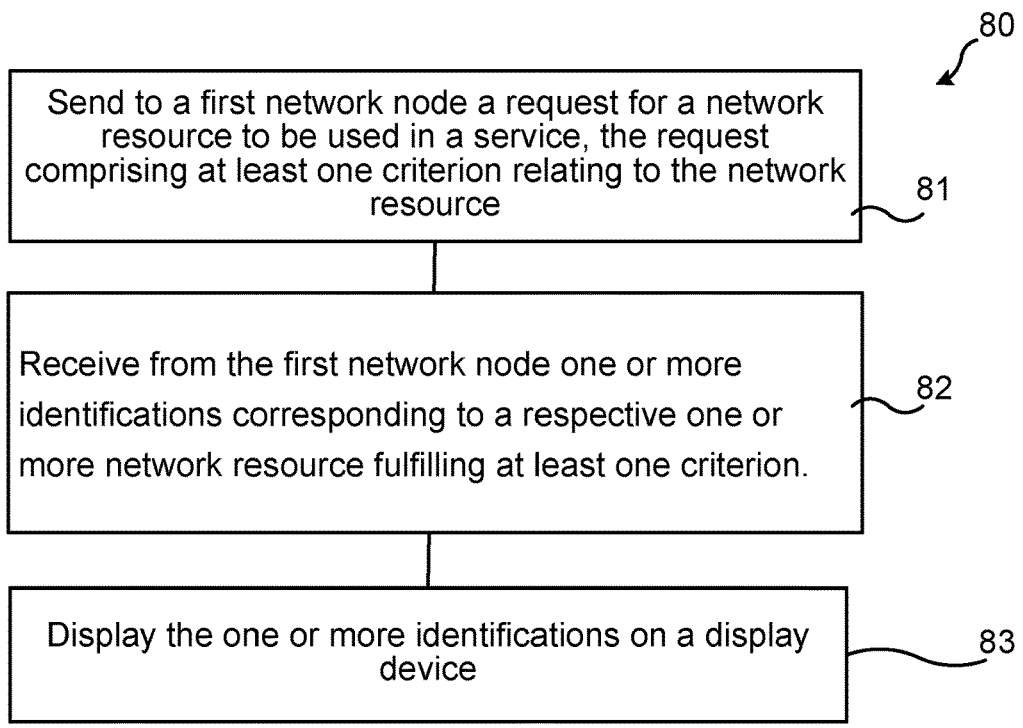
FIG. 9 illustrates a flow chart over steps of a method in a client device in accordance with the present disclosure.

FIG. 9 illustrates a flow chart over steps of a method in a client device in accordance with the present disclosure. The method 80 is performed in a client device 2 for enabling a user to select a network resource of a distributed cloud network 1 providing services to users.

The method 80 comprises sending 81, to a first network node 11, a request for a network resource to be used in a service, the request comprising at least one criterion relating to the network resource.

The method 80 comprises receiving 82, from the first network node 11, one or more identifications corresponding to a respective one or more network resource fulfilling the at least one criterion.

The method 80 comprises displaying 83 the one or more identifications on a display device 95, enabling a user to select one of the identified network resources to be used for the service.

The method 80 may for example be implemented as an application running in the client device 2.

In an embodiment, the method 80 comprises, before the sending 81, receiving a user input comprising the at least one criterion.

In a variation of the above embodiment, the user input is received from an application running on the client device 2, or from a user input device 96, or from a webpage.

Figure 10:
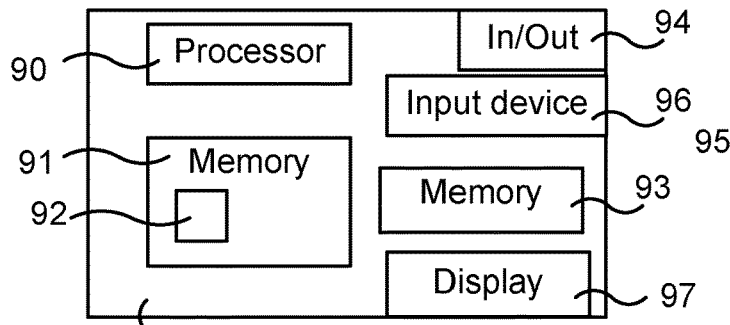
FIG. 10 illustrates schematically a client device and means for implementing embodiments of a method of the present disclosure.

FIG. 10 illustrates schematically a client device and means for implementing embodiments of a method of the present disclosure. The client device 2 may for example comprise a personal computer, a laptop, a user equipment, a mobile terminal etc.

The client device 2 comprises an input/output device 94 for communicating with a network node 11 of the distributed cloud network 1. Such input/output device may for example comprise an interface. The client device 2 also comprises an input device 96 for receiving user input, e.g. enabling the user to input a request in accordance with what has been described. The client device 2 may further comprise a display means 97, which may be any conventional display device.

The client device 2 comprises a processor 90 comprising any combination of one or more of a central processing unit (CPU), multiprocessor, microcontroller, digital signal processor (DSP), application specific integrated circuit etc. capable of executing software instructions stored in a memory 91, which can thus be a computer program product 91. The processor 90 can be configured to execute any of the various embodiments of the method as described e.g. in relation to FIG. 9.

A client device 2 is provided for enabling a user to select a network resource of a distributed cloud network 1 providing services to users. The client device 2 comprises:

a processor 90; and
a memory 91 storing instructions 92 that, when executed by the processor 90, causes the client device 2 to:

- send, to a first network node 11, a request for a network resource to be used in a service, the request comprising at least one criterion relating to the network resource,
- receive, from the first network node 11, one or more identifications corresponding to a respective one or more network resource fulfilling the at least one criterion, and
- display the one or more identifications on a display device 95, enabling a user to select one of the identified network resources to be used for the service.

Still with reference to FIG. 10, the memory 91 can be any combination of read and write memory (RAM) and read only memory (ROM). The memory 61 also comprises persistent storage, which, for example, can be any single one or combination of magnetic memory, optical memory, solid state memory or even remotely mounted memory.

A data memory 93 may also be provided for reading and/or storing data during execution of software instructions in the processor 90. The data memory 93 can be any combination of read and write memory (RAM) and read only memory (ROM).

The present disclosure also encompasses a computer program product 91 comprising a computer program 92 for implementing the methods as described above, and a computer readable means on which the computer program 92 is stored. The computer program product 91 may be any combination of read and write memory (RAM) or read only memory (ROM). The computer program product 91 may also comprise persistent storage, which for example can be any single one or combination of magnetic memory, optical memory or solid state memory.

The present disclosure thus comprise a computer program 92 for a client device 2 computer program 92 for a client device 2 for selecting a network resource of a distributed cloud network 1 providing services to users. The computer program 92 comprises computer program code, which, when run on the client device 2 causes the client device 2 to:
  send, to a first network node 11, a request for a network resource to be used in a service, the request comprising at least one criterion relating to the network resource,
  receive, from the first network node 11, one or more identifications corresponding to a respective one or more network resource fulfilling the at least one criterion, and
  display the one or more identifications on a display device 95, enabling a user to select one of the identified network resources to be used for the service.

The computer program product, or the memory, thus comprises instructions executable by the processor. Such instructions may be comprised in a computer program, or in one or more software modules or function modules.

Figure 11:
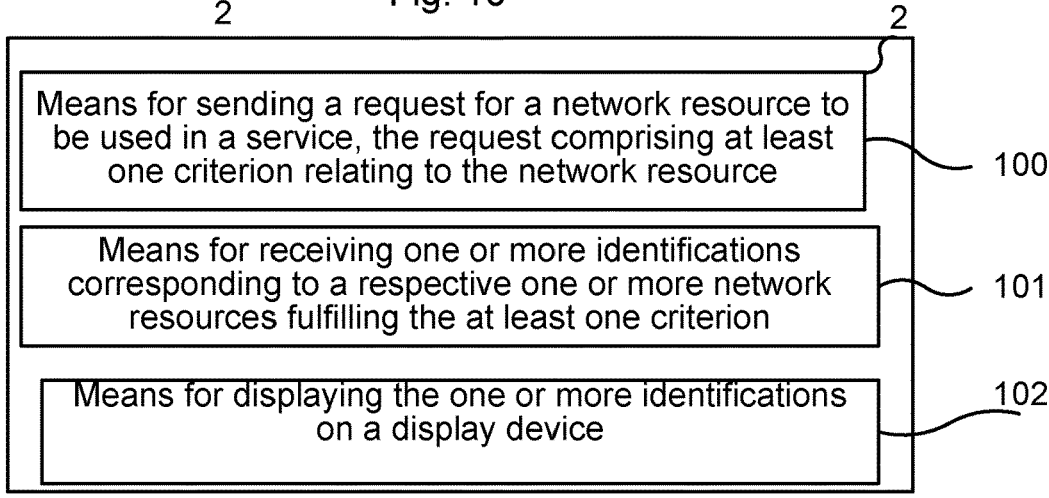
FIG. 11 illustrates a client device comprising function modules/software modules for implementing embodiments of methods of the present disclosure.

An example of an implementation using function modules/software modules is illustrated in FIG. 11, in particular illustrating a client device 2 comprising function modules for implementing methods of the present disclosure. The client device 2 comprises first means 100, for example a first function module, for sending, to a first network node 11, a request for a network resource to be used in a service, the request comprising at least one criterion relating to the network resource. The client device 2 comprises second means 101, for example a second function module, for receiving, from the first network node 11, one or more identifications corresponding to a respective one or more network resource fulfilling the at least one criterion. The client device 2 comprises third means 102, for example a third function module, for displaying the one or more identifications on a display device 95, enabling a user to select one of the identified network resources to be used for the service.

The functional modules 100, 101, 102 can be implemented using software instructions such as computer program executing in a processor and/or using hardware, such as application specific integrated circuits, field programmable gate arrays, discrete logical components etc.

The invention has mainly been described herein with reference to various embodiments. However, as is appreciated by a person skilled in the art, other embodiments than the particular ones disclosed herein are equally possible within the scope of the invention, as defined by the appended patent claims.

The invention claimed is:

1. A method performed in a distributed cloud network for identifying a network resource of the distributed cloud network, wherein the distributed cloud network is divided into a hierarchical distributed system comprising at least a first domain, the method comprising:
  receiving, in a first network node, a request from a client device for a network resource to be used in providing a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or a company,
  resolving, in the first network node, the first part of the request, thereby identifying one or more domains each comprising at least one network resource fulfilling the first criterion, and
  sending, from the first network node to the client device, one or more identifications each corresponding to one of the network resources fulfilling the first criterion, the second criterion, and the third criterion.

2. The method of claim 1, further comprising:
  sending, from the first network node to a second network node of the identified domain, a message comprising the second part and the third part of the string, wherein the second part or the third part of the string identifies the country or the company;
  resolving, in the second network node, the second part of the request thereby identifying at least one sub-domain comprising a network resource fulfilling the second criterion of the network resource, and
  sending from the second network node to the first network node, the one or more identifications.

3. The method of claim 1 further comprising:
  receiving in the client device a user input comprising at least one criterion.

4. The method of claim 1, wherein each domain comprises at least one root server and each root server is capable of obtaining information about root servers lower in the hierarchy of domains.

5. The method of claim 1, wherein the request comprises one or more of: physical location of the network resource, ownership of the network resource, security level of the network resource, capacity of the network resource, services provided by the network resource, free resources of a particular service, hardware available or connected to the network resource, latency between the client device and the network resource, bandwidth between the client device and the network resource.

6. The method of claim 1, wherein the request is sent in an extended Domain Name System query message, a Hypertext Transfer Protocol (HTTP) POST request or in a Session Description Protocol payload of a signaling protocol message.

7. The method of claim 1, performed in the first network node.

8. The method of claim 7, wherein the hierarchical distributed system comprises at least one sub-domain subordinate to the first domain, the method further comprising:
  sending, to a second network node of the identified domain, a message comprising the second part and the third part of the string, wherein the second part or the third part of the string identifies the country or the company, and
  receiving, from the second network node, the one or more identifications.

9. The method of claim 1, wherein an order of parts in said string corresponds to a hierarchy of criterion.

10. The method of claim 1, wherein the first criterion corresponding to the first part of said string is a sub-criterion of the second criterion corresponding to the second part of said string that is to the right of said first part.

11. The method of claim 1, wherein the first part of the string identifies a first geographic region and the second part of the string comprises a company name.

12. The method of claim 1, wherein the first criterion corresponding to the first part of said string defines a first characteristic of the network resource and the second criterion corresponding to the second part of said string defines a second characteristic of the network resource.

13. The method of claim 1, wherein the first part of the string identifies a first geographic region and the second part of the string identifies a second geographic region located within the first geographic region.

14. The method of claim 13, wherein the second part of the string identifies a country within the first geographic region.

15. A distributed cloud network for identifying a network resource of the distributed cloud network, wherein the distributed cloud network is divided into a hierarchical distributed system comprising at least a first domain, the distributed cloud network comprising:
at least one processor; and
at least one memory storing instructions that, when executed by the at least one processor, causes the distributed cloud network to:
receive, in a first network node, a request from a client device for a network resource to be used in providing a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company,
resolve, in the first network node, the first part of the request, thereby identifying one or more domains each comprising at least one network resource fulfilling the first criterion, and
send, from the first network node to the client device, the one or more identifications corresponding to a respective one or more network resource fulfilling the first criterion, the second criterion, and the third criterion.

16. The distributed cloud network of claim 15, further operative to:
send, from the first network node to a second network node of the identified domain, a message comprising the second part and the third part of the string, wherein the second part or the third part of the string identifies the country or the company,
resolve, in the second network node, the second part of the request thereby identifying at least one sub-domain comprising a network resource fulfilling the second criterion of the network resource, and
send from the second network node to the first network node, the one or more identifications.

17. The distributed cloud network of claim 15, further operative to receive in the client device a user input comprising at least one criterion.

18. The distributed cloud network of claim 15, wherein each domain comprises at least one root server and each root server is capable of obtaining information about root servers lower in the hierarchy of domains.

19. The distributed cloud network of claim 15, wherein the request comprises one or more of: physical location of the network resource, ownership of the network resource, security level of the network resource, capacity of the network resource, services provided by the network resource, free resources of a particular service, hardware available or connected to the network resource, latency between the client device and the network resource, bandwidth between the client device and the network resource.

20. The distributed cloud network of claim 15, wherein the request is included in an extended Domain Name System query message, a Hypertext Transfer Protocol POST request or in a Session Description Protocol payload of a signaling protocol message.

21. A network node of a distributed cloud network for identifying a network resource of the distributed cloud network, wherein the distributed cloud network is divided into a hierarchical distributed system comprising at least a first domain, the network node comprising:
a processor; and
a memory storing instructions that, when executed by the processor, causes the network node to:
receive a request from a client device for a network resource to be used in providing a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company,
resolve the first part of the request, thereby identifying one or more domains each comprising at least one network resource fulfilling the first criterion, and
send to the client device, the one or more identifications corresponding to a respective one or more network resource fulfilling the first criterion, the second criterion, and the third criterion.

22. The network node of claim 21, further operative to:
send, to a second network node of the identified domain, a message comprising the second part and the third part of the string, wherein the second part or the third part of the string identifies the country or the company,
receive, from the second network node, the one or more identifications.

23. A computer program product comprising a non-transitory computer readable medium comprising a computer program for a network node of a distributed cloud network for identifying a network resource of the distributed cloud network, wherein the distributed cloud network is divided into a hierarchical distributed system comprising at least a first domain, the computer program comprising computer program code, which, when run on the network node causes the network node to:
receive a request from a client device for a network resource to be used in providing a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company, resolve the first part of the request, thereby identifying one or more domains each comprising at least one network resource fulfilling the first criterion, and send to the client device, the one or more identifications corresponding to a respective one or more network resource fulfilling the first criterion, the second criterion, and the third criterion.

24. A method performed in a client device for enabling a user to select a network resource of a distributed cloud network providing services to users, the method comprising:

sending, to a first network node, a request for a network resource to be used in a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company, receiving, from the first network node, one or more identifications corresponding to a respective one or more network resource fulfilling the first criterion, the second criterion, and the third criterion, and displaying the one or more identifications on a display device, enabling a user to select one of the identified network resources to be used for the service.

25. The method of claim 24, comprising, before the sending, receiving a user input comprising at least one criterion.

26. The method of claim 25, wherein the user input is received from an application running on the client device, or from a user input device, or from a webpage.

27. A client device for enabling a user to select a network resource of a distributed cloud network providing services to users, the client device comprising:

a processor; and a memory storing instructions that, when executed by the processor, causes the client device to:

send, to a first network node, a request for a network resource to be used in a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company, receive, from the first network node, one or more identifications corresponding to a respective one or more network resource fulfilling the first criterion, the second criterion, and the third criterion, and display the one or more identifications on a display device, enabling a user to select one of the identified network resources to be used for the service.

28. A computer program product comprising a non-transitory computer readable medium comprising a computer program for a client device for selecting a network resource of a distributed cloud network providing services to users, the computer program comprising computer program code, which, when run on the client device causes the client device to:

send, to a first network node, a request for a network resource to be used in a service, the request comprising a string comprising a first part, a second part, and a third part, wherein the first part corresponds to a first criterion relating to the network resource, the second part corresponds to a second criterion relating to the network resource, the third part corresponds to a third criterion relating to the network resource, a delineator separates the first part from the second part, a delineator separates the second part from the third part, and at least one of the parts of the string identifies a country or company, receive, from the first network node, one or more identifications corresponding to a respective one or more network resource fulfilling the first criterion, the second criterion, and the third criterion, and display the one or more identifications on a display device, enabling a user to select one of the identified network resources to be used for the service.

* * * * *